United States Patent [19]

Bellos et al.

[11] 3,923,100

[45] Dec. 2, 1975

[54] COMPOSITIONS USEFUL IN PLUGGING FORMATIONS

[75] Inventors: Thomas J. Bellos, Kirkwood; Donald U. Bessler, St. Louis, both of Mo.

[73] Assignee: Petrolite Corporation, St. Louis, Mo.

[22] Filed: Sept. 28, 1973

[21] Appl. No.: 401,578

[52] U.S. Cl. .............................. 166/281; 166/294

[51] Int. Cl.[2] .................. E21B 33/13; E21B 43/26

[58] Field of Search ................ 166/281, 294, 305 R

[56] References Cited

UNITED STATES PATENTS

| | | | |
|---|---|---|---|
| 2,024,119 | 12/1935 | Vietti et al. | 166/294 |
| 2,331,594 | 10/1943 | Blair | 166/305 R |
| 2,838,116 | 6/1958 | Clark et al. | 166/294 |
| 3,047,066 | 7/1962 | Mosely | 166/294 |
| 3,097,168 | 7/1963 | Gibson | 166/294 |
| 3,343,599 | 9/1967 | Eddins et al. | 166/294 |
| 3,404,734 | 10/1968 | Raifsnider | 166/294 |
| 3,684,733 | 8/1972 | Bannister et al. | 166/294 |
| 3,719,228 | 3/1973 | Carcia et al. | 166/281 |

*Primary Examiner*—Ernest R. Purser
*Assistant Examiner*—Jack E. Ebel
*Attorney, Agent, or Firm*—Sidney B. Ring; Hyman F. Glass

[57] ABSTRACT

This invention relates to a method of treating oil- and water-bearing formations to stimulate the production of oil while simultaneously retarding the production of water-producing passages by employing a composition comprising a solution of an acid salt of a fatty amine containing, when necessary, a wetting agent to allow the solution to be pumped with ease into the formation.

The compositions, which are generally dissolved in an organic solvent such as a hydrocarbon solvent to facilitate easy handling, are employed as preflush compositions to plug water-bearing passages while leaving oil-bearing passages open. Thereupon an acid solution is pumped into the formation to selectively acidize and stimulate the oil-bearing passages.

4 Claims, No Drawings

COMPOSITIONS USEFUL IN PLUGGING FORMATIONS

There are numerous methods of treating earth formations from which oil and water are produced simultaneously from different and separate water and oil producing formations. Our invention relates to the use of a preflush composition whereby a chemical formulation is pumped into the well for the purpose of plugging or restricting the water producing formation while not effecting the oil producing portion of the formation.

Numerous methods have been proposed as procedures for treating selectively the oil and or water bearing portion of a given formation. U.S. Pat. No. 2,294,078 discloses the use of aqueous fatty acid soap solutions. To correct the oleophobic nature of these aqueous solutions and to make the soap more oleophilic U.S. Pat. No. 3,421,585 discloses the use of a preflush solution comprising a hydrocarbon solution of a fatty acid soap and wetting agent which is pumped into the formation prior to acidizing. The acid soap hydrates when it comes in contact with the water bearing portion of the formation so as to form a precipitate which seals the water producing formation. Then the well is acidized.

We have discovered that the use of fatty amine salts as a preflush composition gives a composition which is superior to the fatty acid soaps of either U.S. Pat. Nos. 2,294,078 or 3,421,585. Our process is superior to the prior art since it offers particular advantages. Our system offers an advantage over the prior art which requires preparation of the product just prior to use since the fatty acid soap of the prior art tends to gel in the hydrocarbon on standing. In contrast our composition, which does not gel on standing, may be prepared and stored for long periods of time and shipped over long distances without gelling.

Our superiority also applies to the conditions encountered "down hole" in the well prior to and after the addition of a typical hydrochloric acid treatment either alone or in combination with HF acid treatment. The prior art states that an insoluble fatty acid is first treated with base to prepare a soap and the soap is dissolved or dispersed in kerosene and pumped "down hole" into the formation. The well is next acidized.

It can be demonstrated that during the course of acidizing the prior art soaps of fatty acids are neutralized and the fatty acid is converted to the acid form as opposed to the water dispersible salt such as $NH_4^+$, $Na^+$, $K^+$, etc. Such free fatty acids are water or acid insoluble oils such as in the case of oleic acid, which cannot form the precipitate upon contact with the water in the water bearing formation. Thus, the acid salt which is supposed to be effective in blocking off the water bearing formation is rendered almost totally ineffective when converted to the free acid during acidizing.

Once converted to the acid form and in the presence of heat, "down hole" temperature may vary from 90°–350°F. or greater at which temperature the acids are converted to liquids which under the hydraulic pressure of the system will be dislodged as the free acid from the formation.

Our invention employs acid salts of fatty amines. Our products are solid in the well under the conditions of use. The well when acidized has no effect on our amine salts since they are both solid and stable in an acid media. Since our invention employs a product that is stable under acid conditions, it is more effective for a longer period of time and therefore has a more lasting effect.

The preflush composition is oleophilic; hence it is easy to force through the petroleum-bearing channels of the formation to contact contiguous water-bearing zones far from the well bore and block them against entry of subsequently injected acid. Thus, an extensive volume of the petroleum-bearing zones of the formation is acidized without substantially acidizing the water-bearing zones.

The preflush compositions of the invention have been found to react upon contact with most types of connate water found in petroleum reservoirs or formations to produce a precipitate that blocks the water-bearing zones. It is not essential that the connate water or brine contain dissolved calcium or magnesium salts, as a blocking precipitate is formed upon contact of the preflush composition with water alone, or with sodium brine.

The art of acidizing wells has long been practiced, and its general principles are well known to persons skilled in the art. In brief, however, a solution of an acid, such as hydrochloric acid, is introduced into the well and thence into the formation to be acidized. The acid is held in the formation for a time sufficient to allow it to react with the formation matrix to dissolve portions of it, thereby increasing the size of the channels extending through the formation to allow the formation fluids to flow more readily into the well. Calcareous formations, such as limestone or dolomitric limestone formations, are particularly amenable to successful stimulation by acidizing techniques. When the acid has become depleted, the spent acid is withdrawn from the formation through the well, and the formation fluids are produced.

The liquid preflush composition of this invention includes a hydrocarbon oil as a carrier or solvent. Hydrocarbon oils such as kerosene, diesel fuel, crude oil or refined fractions thereof, and the like are employed.

Aqueous solutions of acids capable of dissolving the formation are injected into the formation following the preflush composition. Aqueous hydrochloric acid solutions, typically those of 15 or 28% concentration, are suitable and preferred, but the concentration of the hydrochloric acid may be intermediate, or lower or higher than, these values. Other acids that are conventionally used in acidizing may also be employed in practicing this invention. The acid solutions may, if desired, include surfactants, corrosion inhibitors, retarders, and other conventional additives.

The fatty amine employed herein is any amine, whether aliphatic, e.g., alkyl, alkenyl, alkynyl, etc., aromatic, cycloaliphatic, heterocyclic, etc., which in salt form is soluble in an organic solvent, such as a hydrocarbon solvent; which salt when it contacts water in a water-bearing formation is capable of plugging said formation.

In general, the amine has at least a total of about 6 carbons, such as from about 8–32 or more carbons, for example about 12–20 carbons, but preferably about 18 carbons.

By way of example our invention employs amines of the following types:

| | |
|---|---|
| Tallow | $C_{18}H_{35}NH_2$ |
| Tallow (hydrogenated) | $C_{18}H_{37}NH_2$ |
| Octylamine | $C_8H_{17}NH_2$ |
| Dodecylamine | $C_{12}H_{25}NH_2$ |
| Myristylamine | $C_{14}H_{29}NH_2$ |

-continued

| | |
|---|---|
| Hexadecylamine | $C_{16}H_{33}NH_2$ |
| Octadecyl amine | $C_{18}H_{37}NH_2$ |
| Oleylamine | $C_{18}H_{35}NH_2$ |
| Soya amine | $C_{18}H_{35}NH_2$ |
| Coco-amine | $C_{12}H_{25}NH_2$ |

Any amine product that will form an acid salt which is capable of plugging the water bearing formation of a down hole operation can be employed.

The acid salts are typically formed with inorganic as well as organic acids. For example:

1. $C_{18}H_{37}NH_2.HX$ where X is halogen, i.e., Cl, Br, F, I
2. $C_{18}H_{37}NH_2 \, . \, HO\overset{\overset{O}{\|}}{C}R$ where R is an acid moiety for example, aliphatic, aryl, cycloaliphatic, etc., preferably $CH_3$—
3. $C_{18}H_{37}NH_2 \, . \, H_2SO_4$
4. $C_{18}H_{37}NH_2$ . 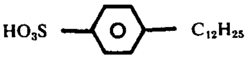

In addition to the amine salt a surfactant may be added to "extend" the gell that immediately forms when the amine salt contacts water. Our invention is formulated with or without a surfactant prepared in organic solvents such as hydrocarbon solvents such as aliphatic, aromatic hydrocarbons or combination of solvents.

The hydrocarbon solvent could be substituted in whole or in part with other solvent, such as alcohols, ketones, etc.

In addition to the prior mentioned primary amines, typically secondary amines which can also be employed are of the general formula $$\begin{array}{c} R'NH \\ | \\ R^2 \end{array}$$

Where R' is an alkyl group saturated or unsaturated from $C_1$–$C_{18}$ and $R_2$ is a saturated or unsaturated from $C_1$–$C_{18}$ for example

| | |
|---|---|
| $(C_{12}H_{25})_2$—NH | DiCocoamine |
| $(C_{13}H_{37})_2$—NH | Dihydrogenated amine |
| $(C_{18}H_{37})_2$—NH | Di-Soya amine |
| $C_{18}H_{37}$—NH with $CH_3$ on N | mono-methyl cocoamine |
| $C_{18}H_{37}$—NH with $CH_3$ on N | mono-methyl Tallow amine |

Tertiary amines can also be employed as illustrated by the following:

n-dodecyl dimethylamine
n-tetradecyl dimethyl amine
n-hexadecyl dimethyl amine
n-octadecyl dimethyl amine
coco dimethyl amine
n-dodecyl n-tetradecyl methyl amine
hydrogenated tallow dimethyl amine
soya dimethylamine
N-cocomorpholine Laboratory evaluation is accomplished in the following manner:

A cylindrical core, 2 inches in length and 1 inch in diameter, is drilled from the limestone of the formation. The core is cut in half along its major axis. One half is saturated with kerosene to simulate an oil-bearing portion of a formation. The other half is saturated with a synthetic brine (8.5% NaCl; 2.5% $CaCl_2$; 90% water) to simulate a water-bearing portion of the formation. The two halves are put back together with a thin rubber membrane separating them. The thus treated and reassembled core is loaded into a core-testing cell in which liquid can be caused to flow axially through the core.

The preflush composition is pumped through the core to saturate it to the extent possible. Thereafter, 28% aqueous hydrochloric acid solution is pumped through the core at a slow rate to permit the acid to react with the limestone. Then the core is flushed with water.

The core is then removed from the testing cell and the two halves are visually examined. The core half that was originally saturated with kerosene shows severe attack by the acid, whereas the half that was originally saturated with brine shows only superficial etching of its upstream end without any dissolution of its main body.

From this test, it is evident that the preflush treatment precludes the flow of acid through the brine-saturated half of the core. The entire flow of acid is diverted through the oil-saturated half of the core, wherein the acid reacts with the matrix.

Any suitable surfactant can be employed. The surfactants most usually employed in the practice of this invention are generally known as oxyalkylated surfactants or more specifically polyalkylene ether or polyoxyalkylene surfactants. Oxyalkylated surfactants as a class are well known. The possible sub-classes and specific species are legion. The methods employed for the preparation of such oxyalkylated surfactants are also too well known to require much elaboration. Most of these surfactants contain, in at least one place in the molecule and often in several places, an alkanol or a polyglycolether chain. These are most commonly derived by reacting a starting molecule, possessing one or more oxyalkylatable reactive groups, with an alkylene oxide such as ethylene oxide, propylene oxide, butylene oxide, or higher oxides, epichlorohydrin, etc. However, they may be obtained by other methods such as shown in U.S. Pat. Nos. 2,588,771 and 2,596,091–3, or by esterification or amidification with an oxyalkylated material, etc. Mixtures of oxides may be used as well as successive additions of the same or different oxides may be employed. Any oxyalkylatable material may be employed. As typical starting materials may be mentioned alkyl phenols, phenolic resins, alcohols, glycols, amines, organic acids, carbohydrates, mercaptans, and partial esters of polybasic acids. In general, the art teaches that, if the starting material is water-soluble, it may be converted into an oil-soluble surfactant by the addition of polypropoxy or polybutoxy chains. If the starting material is oil-soluble, it may be converted into a water-soluble surfactant by the addition of polyethoxy chains. Subsequent additions of ethoxy units to the chains tend to increase the water solubility, while, subsequent additions of high alkoxy chains tend to increase the oil solubility. In general, the final solubility and surfactant properties are a result of a balance between the oil-soluble and water-soluble portions of the molecule.

In general, the surfactants are oxyalkylated surfactants of the general formula $Z[(OR)_nOH]_m$ wherein Z is the oxyalkylatable material, R is the radical derived from the alkylene oxide which can be, for example, ethylene, propylene, butylene, epichlorohydrin and the like, $n$ is a number determined by the moles of alkylene oxide reacted, for example 1 to 2000 or more and $m$ is a whole number determined by the number of reactive oxyalkylatable groups. Where only one group is oxyalkylatable as in the case of a monofunctional phenol or alcohol R'OH, then $m$=1. Where Z is water, or a glycol, $m$=2. Where Z is glycerol, $m$=3, etc.

In certain cases, it is advantageous to react alkylene oxides with the oxyalkylatable material in a random fashion so as to form a random copolymer on the oxyalkylene chain, i.e. the $[(OR)_nOH]_m$ chain such as

—AABAAABBABABBABBA—

In addition, the alkylene oxides can be reacted in an alternate fashion to form block copolymers on the chain, for example

—BBBAAABBBAAAABBBB— or

—BBBBAAACCCAAAABBBB— where A is the unit derived from one alkylene oxide, for example ethylene oxide, and B is the unit derived from a second alkylene oxide, for example propylene oxide, and C is the unit derived from a third alkylene oxide, for example, butylene oxide, etc. Thus, these compounds include terpolymers or higher copolymers polymerized randomly or in a block-wise fashion or many variations of sequential additions.

Thus, $(OR)_n$ in the above formula can be written $—A_aB_bC_c—$ or any variation thereof, wherein $a$, $b$, and $c$ are 0 or a number provided that at least one of them is greater than 0.

It cannot be overemphasized that the nature of the oxyalkylatable starting material used in the preparation of the surfactant is not critical. Any species of such material can be employed. By proper additions of alkylene oxides, this starting material can be rendered suitable as a surfactant.

REPRESENTATIVE EXAMPLES OF Z

| No. | Z |
|---|---|
| 1 | O<br>‖<br>RC—O— |
| 2 | 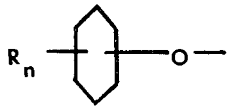 |
| 3 | R—O— |
| 4 | R—S— |
| 5 | O H<br>‖ \|<br>R—C—N— |
| 6 | O<br>‖<br>R—C—N< |
| 7 | H<br>\|<br>R—N— |
| 8 | RN< |
| 9 | Phenol-aldehyde resins. |
| 10 | —O— (Ex. Alkylene oxide block polymers.) |
| 11 | 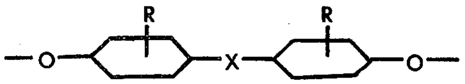<br>O<br>‖<br>X=—O—, —S—, —CH₂—S—, etc.<br>‖<br>O |

—Continued

REPRESENTATIVE EXAMPLES OF Z

| No. | Z |
|---|---|
| 12 | O<br>‖<br>R—S—CH₂C—O— |
| 13 | $RPO_4H$— |
| 14 | $RPO_4$< |
| 15 | $PO_4$ ≡ |
| 16 | 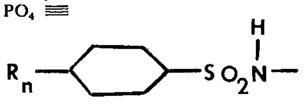 |
| 17 |  |
| 18 | 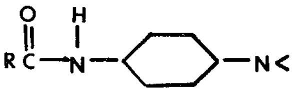 |
| 19 | Polyol-derived. (Ex.: Glycerol, glucose, pentacrythritol.) |
| 20 | Anhydrohexitan or anhydrohexide derived. (Spans and Tweens.) |
| 21 | Polycarboxylic derived. |
| 22 | $—CHCH_2—O_n$<br>\|<br>$CH_2$<br>\|<br>amine |

Examples of oxyalkylatable materials derived from the above radicals are legion and these, as well as other oxyalkylatable materials, are known to the art. A good source of such oxyalkylatable materials, as well as others, can be found in "Surface Active Agents and Detergents," vol. 1 and 2, by Schwartz, et al., Interscience Publishers (vol. 1, 1949-vol. 2, 1958) and the patents and references referred to therein.

Other types of surfactants beside non-ionic surfactants such as of the oxyalkylated type such as anionic, cationic, ampholytic, etc., provided they perform their function herein, such as for example, those of the carboxylate, sulfate, sulfonate, etc., type such as for example alkanesulfonates, alkaryl sulfonates, etc.

As is quite evident, new surfactants will be constantly developed which could be useful in our compositions. It is therefore not only impossible to attempt a comprehensive catalogue of such compositions, but to attempt to describe the invention in its broader aspects in terms of specific chemical names of its components used would be too voluminous and unnecessary since one skilled in the art could by following the testing procedures described herein select the proper agent. This invention lies in the use of suitable surfactants in preparing the compositions of this invention and their individual composition is important only in the sense that their properties can effect their use. To precisely define each specific surfactant useful herein in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduct with confidence the applicability of suitable surfactants. In analogy to the case of a machine wherein the use of certain materials of construction or dimensions of parts would lead to no practical useful result, various materials will be rejected as inapplicable where others would be operative. One can obviously assume that no one will wish to make a useless composition or will be misled because it is possible to misapply the teachings of the present disclosure in order to do so. Thus, any surfactant that can perform the function stated herein can be employed.

FIELD PRACTICES

The following is an outline of a general procedure that may be followed in treating an oil well in accordance with the invention.

I. Clean all of the mixing tanks, pumps and lines so that they are free of water, acid, and chemicals. If these substances are present in the equipment, they may cause the premature and undesired formation of a precipitate when they are contacted by the preflush composition.

II. The formation to be treated is isolated to insure that the treating liquids enter such formation only. The formation is isolated in a well known manner by using, for example, a bridge plug below the formation and a packer on the tubing above the formation.

III. If the well is loaded with water, it is better not to pump such water into the formation, but to circulate it out of the isolated zone with clean, water-free crude oil. This step minimizes contamination of the oil-bearing portions of the formation with water.

IV. A spearhead of a few barrels of clean, water-free crude oil, kerosene, or diesel fuel is pumped down the tubing and into the formation. The spearhead preferentially enters the oil-bearing portions of the formation and sweeps ahead of it any water therein. This assures that the preflush composition, which follows, will contact the spearhead, rather than water, in the oil-bearing passages.

V. The liquid preflush composition is next pumped into the formation. It flows into and through the oil-bearing passages without forming a soap precipitate. When it encounters a water-bearing passage and contacts the water at the entrance thereof, the salt is precipitated and fills the pores of the water-bearing passage, thereby stopping further flow of preflush composition thereinto.

VI. A pad or spacer of a few barrels of clean, water-free crude oil, kerosene or diesel fuel is then injected into the well and into the formation. The spacer fluid preferentially enters the oil-bearing passages and forces the preflush liquid and spearhead further back into the formation. Although there may be a slight tendency of the spacer fluid to dissolve the precipitate in the entrances of the water-bearing passages, the volume of the spacer, the pressure tending to drive it into such passages, and the time during which the spacer can contact the precipitate are kept to minimums. Thus, in practice, the precipitate is not dissolved in the spacer to any significant degree, and the water-bearing passages remain blocked.

VII. The acid solution is then pumped down the tubing and into the formation. Because the water-bearing passages are blocked, the acid solution cannot flow into them. Instead it flows into the oil-bearing passages, pushing back the spacer liquid, the preflush, and the spearhead, which perform their functions as they successively encounter adjoining oil-bearing and water-bearing passages farther back in the formation. The acid solution used is preferably an aqueous solution; it should not contain any substantial proportion of oil, as do the acid-in-oil emulsions sometimes employed in acidizing wells, because such oil would dissolve some or all of the precipitate in adjoining water-bearing passages and allow the acid to enter them and react with the formation matrix therein, thus defeating the main purpose of the invention. Small proportions of oil can be tolerated in the acid. The acid is injected at relatively low rates in order to minimize the possibility of fracturing the formation or dislodging the soap precipitate from the water-bearing zones.

VIII. When the required volume of acid has been pumped into the formation, the well is shut in for a period of a few hours to allow the acid to react with the formation, principally in the oil-bearing zones thereof.

IX. When the acid treatment is completed, the well is produced in the usual manner. The spent acid is produced first. Thereafter the spacer, the preflush solution, and the spearhead are produced, usually in that order. Formation fluids are then produced. In withdrawing the treating solutions from the oil-bearing passages, the spacer flushes the spent acid from the passages so that the preflush solution, which follows the spacer will not contact the spent acid and form an unwanted precipitate in the oil-bearing passages.

The precipitate is soluble in oil. Hence, as production continues, the precipitate in the water-bearing passage is, in time, dissolved by the produced oil, and water is again produced. However, the rate of production of water is generally not substantially increased by the foregoing well treatment, yet the rate of production of oil is usually significantly increased.

If, despite the precautions taken to prevent precipitation in the oil-bearing passages, some salt does precipitate, no great harm is done, as the precipitate is soluble in the formation oil and will be dissolved in the oil and carried from the formation by it.

The volumes of the treating solutions employed will, of course, depend on the type of formation, its thickness, and the distance outward from the well that the formation is to be treated. Field experience is the best guide in these matters. In treating formations having thicknesses of from about 1 to about 20 ft., about 5 barrels of spearhead, about 250 to 500 gallons of preflush composition, from about 2 to 5 barrels of spacer, and from about 2,000 to 10,000 gallons of acid are advantageously employed.

FIELD EXAMPLE

In a well in West Texas a 55 gallon drum of our product, namely 20% Tallow Amine Acetate, 40% oxyalkylated surfactant and 60% alcohol-hydrocarbon solvent, was added to 500 gallons of diesel fuel and pumped down hole. After 5 minutes the well was acidized. The well began producing 100 bbl. of oil and 30 bbl. of water where prior to treatment it was producing 30–40 bbl. of oil and 30 bbl. water.

The tallow amine acetate has the general formula $C_{18}H_{35}NH_2.CH_3COOH$ and the oxyalkylated surfactant is oxyethylated alkyl phenol.

Any suitable formulation of this invention can be employed. In general, the compositions employed in this invention comprise the following based on weight percent of the three components in the table.

| | | General Range | Preferred Range | Optimum Range |
|---|---|---|---|---|
| (1) | Amine Salt | 10–40 | 15–25 | 18–20 |
| (2) | Surfactant or wetting agent | 10–60 | 25–50 | 30–45 |
| (3) | Solvents | 40–60 | 25–45 | 30–40 |

We claim:

1. A process of plugging an earth formation comprising a petroleum-containing formation and a water-bearing formation, said earth formation being in communication with a well, which comprises:

1. introducing into said well a preflush composition comprising a non-aqueous solution of a fatty amine acid salt, and
2. forcing said solution into the formation so that when said solution comes into contact with the water-bearing formation it will plug said water-bearing formation.

2. The process of claim 1 where the formation is further treated by 1. introducing into said well an acid capable of dissolving the formation, and
2. forcing said acid solution into the formation following said preflush composition.

3. The process of claim 1 where the fatty amine acid salt is tallow amine acetate.

4. The process of claim 2 where the fatty amine acid salt is tallow amine acetate.

* * * * *